United States Patent [19]

Fettes et al.

[11] Patent Number: 4,917,794

[45] Date of Patent: Apr. 17, 1990

[54] REGENERATION SENSING DEVICE

[75] Inventors: Don G. Fettes; Myles P. Marusiak, both of Regina; Gerald R. Mushka, White City, all of Canada

[73] Assignee: Water Conditioning Canada Ltd., Regina, Canada

[21] Appl. No.: 329,367

[22] Filed: Mar. 27, 1989

[51] Int. Cl.$^4$ .................................... B01J 49/00
[52] U.S. Cl. .................................... 210/96.1; 210/140
[58] Field of Search ............... 210/662, 742, 746, 96.1, 210/103, 140, 143, 190, 191

[56] References Cited

U.S. PATENT DOCUMENTS

| | | | |
|---|---|---|---|
| 3,768,649 | 10/1973 | Fleckenstein | 210/96.1 |
| 4,257,887 | 3/1981 | Rak et al. | 210/96.1 |
| 4,320,010 | 3/1982 | Tucci et al. | 210/96.1 |
| 4,814,090 | 3/1989 | Kunz et al. | 210/96.1 |

Primary Examiner—Ivars Cintins
Attorney, Agent, or Firm—Nixon & Vanderhye

[57] ABSTRACT

The disclosure herein describes an apparatus for determining the state of water softening material and water in a water softening tank with a view to determining when regeneration of the water softening material is needed. Top and bottom primary sets of electrically conductive probes are used at a predetermined distance, one above the other within the water softening material, the probes facing into the water softening material and water. Top and bottom secondary sets of electrically conductive probes are also used at a predetermined distance above one another within the softening material, the probes of the secondary sets being exposed to water only. The probes of the top primary set are disposed next to the probes of the top secondary set while the probes of the bottom primary set are disposed adjacent the probes of the bottom secondary set. When the resistances or measurements of the probes of the secondary sets are substantially equal to one another, the probes of the top primary set are defined as a standard against which the probes on the bottom primary set are compared for determining when regeneration is needed.

11 Claims, 4 Drawing Sheets

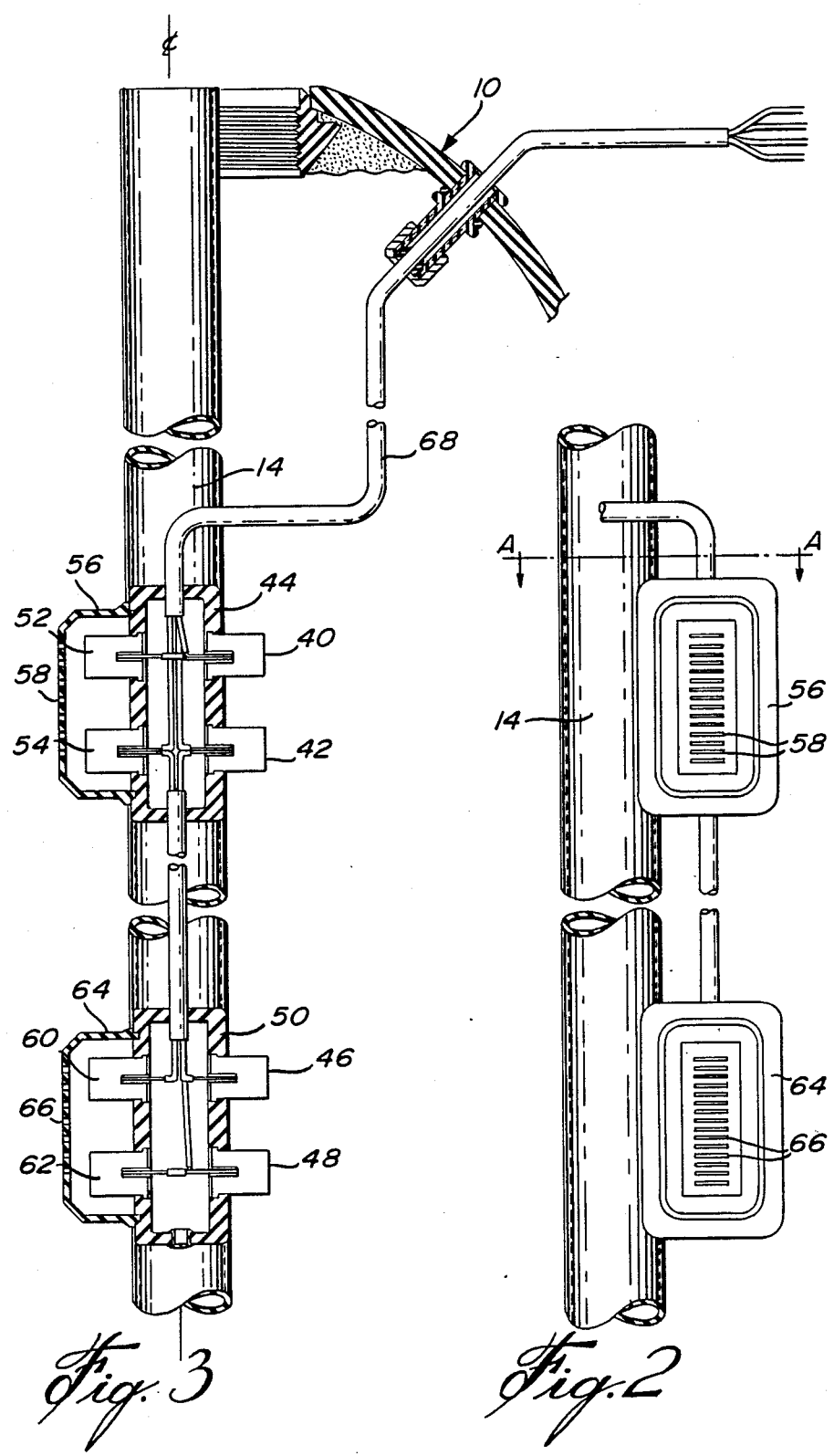

REGENERATION SENSING DEVICE

FIELD OF THE INVENTION

The present invention relates to a system for sensing the need for regeneration of water softening material contained in a water softening tank.

BACKGROUND OF THE INVENTION

A water softening apparatus consists of a tank containing water softening material which receives hard water from a supply line and which softens the water passing through the tank before being supplied through a service outlet. The ion exchange capability of the water softening material becomes depleted after a predetermined amount of hard water has passed through the bed. Regeneration consists of reactivating the bed with materials, such as brine. Electrically conductive probes are set in the water softening tank to determine when regeneration is needed. The principle of comparative sensing is based on the fact that water and water softening material together have varying conductivity from a charged (sodium or soft) state to a depleted (calcium or hard) state.

In Canadian patent Nos. 1,136,088 and 1,167,547, assigned to Culligan International Company, two pairs of electrodes are facing into the water softener bed and water. As the bed depletes, the top set of electrodes changes in conductivity and when the difference between the two sets of electrodes reaches a predetermined difference, means are latched to initiate a regeneration at a preset time. However, this system does not consider the fact that incoming water may vary from the water in the tank, in temperature as well as in total dissolved solids (TDS) and that this may affect the conductivity of the top set of probes, irrespective of the state of the bed of ion exchange resin and the hardness of the water at that point. In effect, the electrodes could be fooled into reading a depleted situation and causing a premature regeneration as a result of changes in temperature or in total dissolved solids.

In U.S. Pat. No. 3,768,649, assigned to Andrew Fleckenstein, one set of probes faces into a resin bed and water and a second set faces into a substantially enclosed chamber containing depleted resin and hard water. As the resin bed in the tank depletes, the conductivity of the first set of probes approaches that of the probes located in the standard. When a predetermined value is reached, a regeneration cycle is initiated at a preset time. However, adverse water conditions, particularly iron fouled water, tend to contaminate the electrodes and resin in the enclosed standard and plug the tiny purge hole which is provided to permit the flow of hard water through the standard. When this happens, the conductivity readings of the standard do not represent true values and the unit malfunctions, severely limiting the application of the sensing system in iron fouled waters.

OBJECTS AND STATEMENT OF THE INVENTION

It is an object of the present invention to eliminate the enclosed chamber around the standard set of electrodes thereby eliminating fouling and keeping both sets of electrodes exposed to water and resin of the same quality.

This is achieved by establishing the top set of probes as a standard when the ion exchange resin is sufficiently depleted at that point. However, to avoid a false conductivity reading, two secondary sets of probes, encased in a perforated housing, are incorporated in the tank so that they are exposed to water only, adjacent to the probes facing into resin and water. When the temperature and the total dissolved solids in the water are equal, the secondary probes have substantially equal conductivity readings. When this condition is met, comparative readings are taken between the bed probes and if a predetermined difference is reached, the top probes are established as a standard. The circuitry now moves to a second comparing phase, looking for the readings to equalize which will indicate that a regeneration is necessary.

To accomplish a regeneration, a two-stage circuit is thus proposed, the sequence of operation being as follows: when the softener is first installed, or after a regeneration, the ion exchange bed is charged and the resistance between the sets of probes is equal. The circuit is now in a first stage and, when the secondary sensors are equal, compares the resistance of the top primary probes to the bottom primary probes. The circuit contains a fixed resistor, or a potentiometer, with a predetermined value. When the resistance of the top probes reaches this predetermined value of the lower probes, the circuit switches to the second stage. The top probes are now facing into depleting resin and hard water and define a standard which can be compared to the lower probes. The circuit is now in a second stage. As the resistance of the lower probes increases, the percentage drops to a predetermined value. This reading may or may not be taken only when the secondary probes have almost identical readings. When this value is reached, the ion exchange bed is depleted far enough to warrant a regeneration. However, because this can occur during the day, the reading is delayed by means of an adjustable alarm time until a predetermined time when water will not be used in a home such as 2:00 AM.

An alternative method of determining a regeneration is to continuously monitor the conductivity percentage of the primary probes, subject to the resistance of the secondary probes being equal. The circuit has a microchip which employs an electronic latch or flip flop. Therefore, when the primary probes reach a set point and the second stage is satisfied, an electronic latch is created indicating that regeneration is needed. At the predetermined alarm time, the condition of the latch is checked to determine if a regeneration should be initiated.

If the circuit indicates a regeneration is needed, a drive motor starts up and controls the flow of water during the regeneration cycle. After regeneration, an electro-mechanical switch resets the circuit to the first stage.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is an elevation view showing the secondary sets of sensing probes used in the present system;

FIG. 3 is an elevation view showing, in cross-section, the primary and secondary sets of sensing probes used in the present invention.

DESCRIPTION OF PREFERRED EMBODIMENTS

Figure 1:
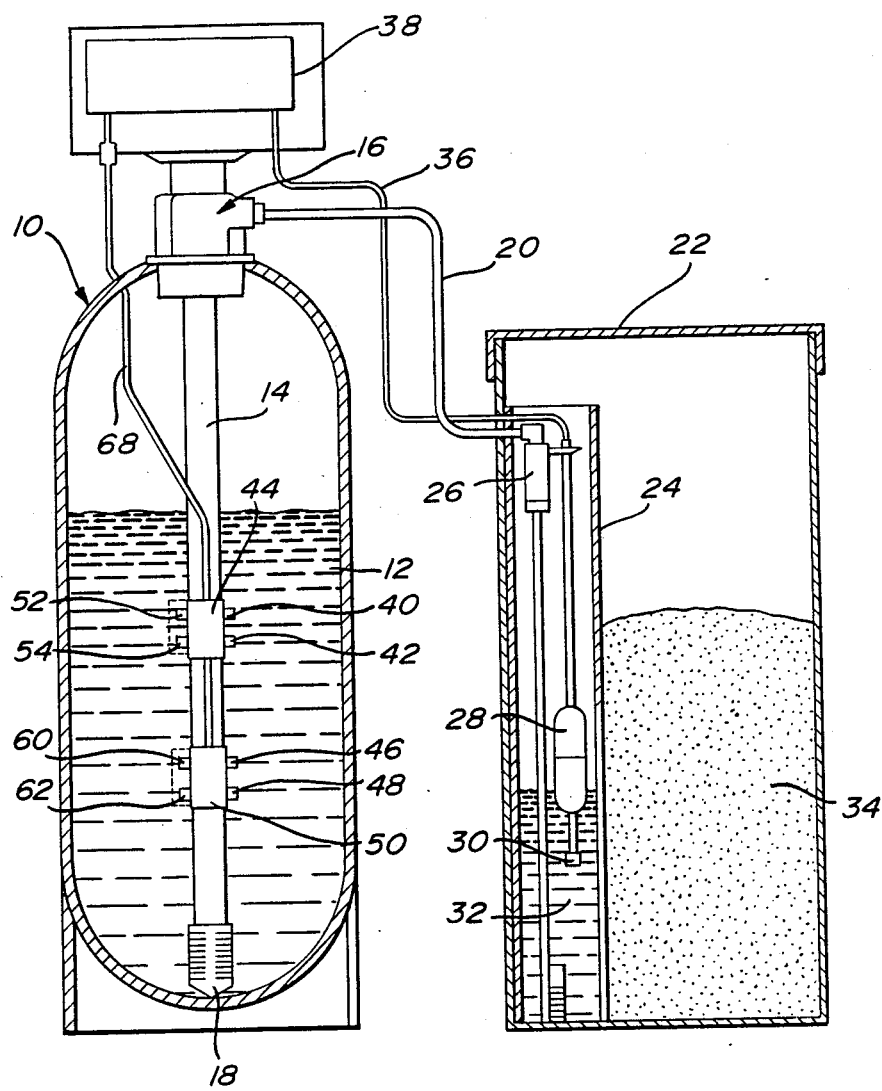
FIG. 1 is a sectional elevation view of a water softening system utilizing the present invention.

Referring to FIG. 1, there is shown a water softening tank 10 containing a bed of water softening material 12, such as a suitable ion exchange resin. A water supply line (not shown) is connected to a control valve 16 mounted at the top of the tank. The water to be treated passes down through the bed 12 and is removed by a tube 14 extending vertically and centrally within the tank and having a distributor 18 at its inlet end. A conduit 20 extends from the valve 16 to to a brine tank 22 that includes a brine well 24 within which are provided a valve 26 and a float 28. A low salt sensor 30 is immerged within the brine 32. A salt bed 34 lies in the remaining portion of the tank 22. A low salt sensor lead wire 36 transmits information obtained by the sensor 30 to an electronic control circuit 38 mounted at the upper part of the tank.

Referring to FIGS. 2 and 3, a top primary set of electrically conductive probes 40 and 42 is mounted to a housing 44 secured to the tube 14. A bottom primary set of electrically conductive probes 46 and 48 is mounted to a housing 50 also secured to the tube 14. The probes 40, 42, 46 and 48 face into the bed of water softening material 12. Probes 40 and 42 of the top primary set are located at a predetermined distance above the bottom probes 46 and 48.

A top secondary set of electrically conductive probes 52 and 54 is also mounted to the upper housing 44 and are contained in a cage 56 having a series of small perforations 58, the size of the perforations being such as to prevent the resin from entering the cage. A bottom secondary set of electrically conductive probes 60 and 62 is mounted to the lower housing 50 and are enclosed in a cage 64 having a series of perforations 66 similar to perforations 58.

The top and bottom secondary sets of probes are therefore caged so that they may be exposed to water only. A conduit 68 serves to conduct the electrical wires connecting each probe to the control circuit 38.

Figure 4A:
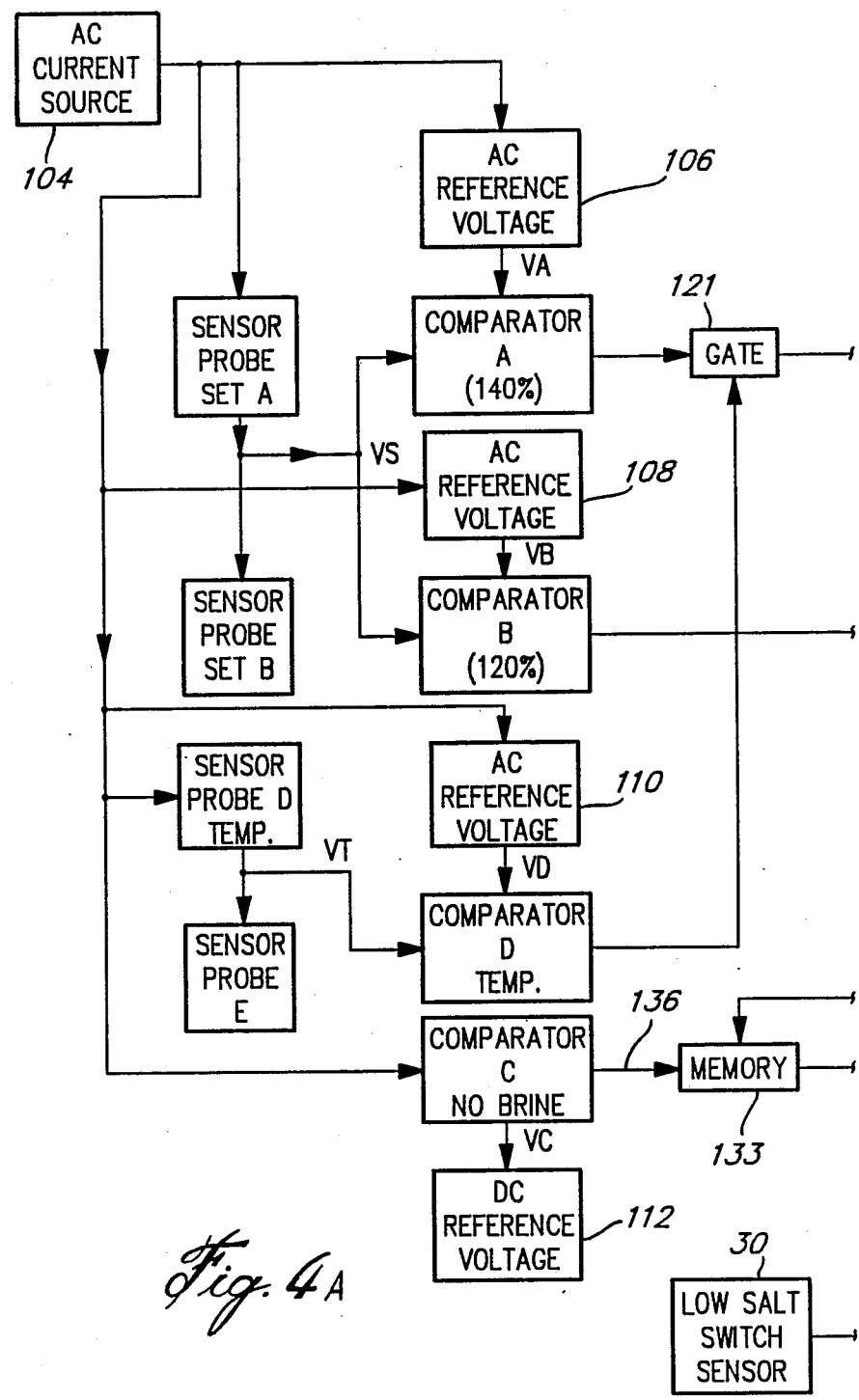
FIGS. 4a and 4b are a diagram of an electrical circuit used with the present invention.
Figure 4B:
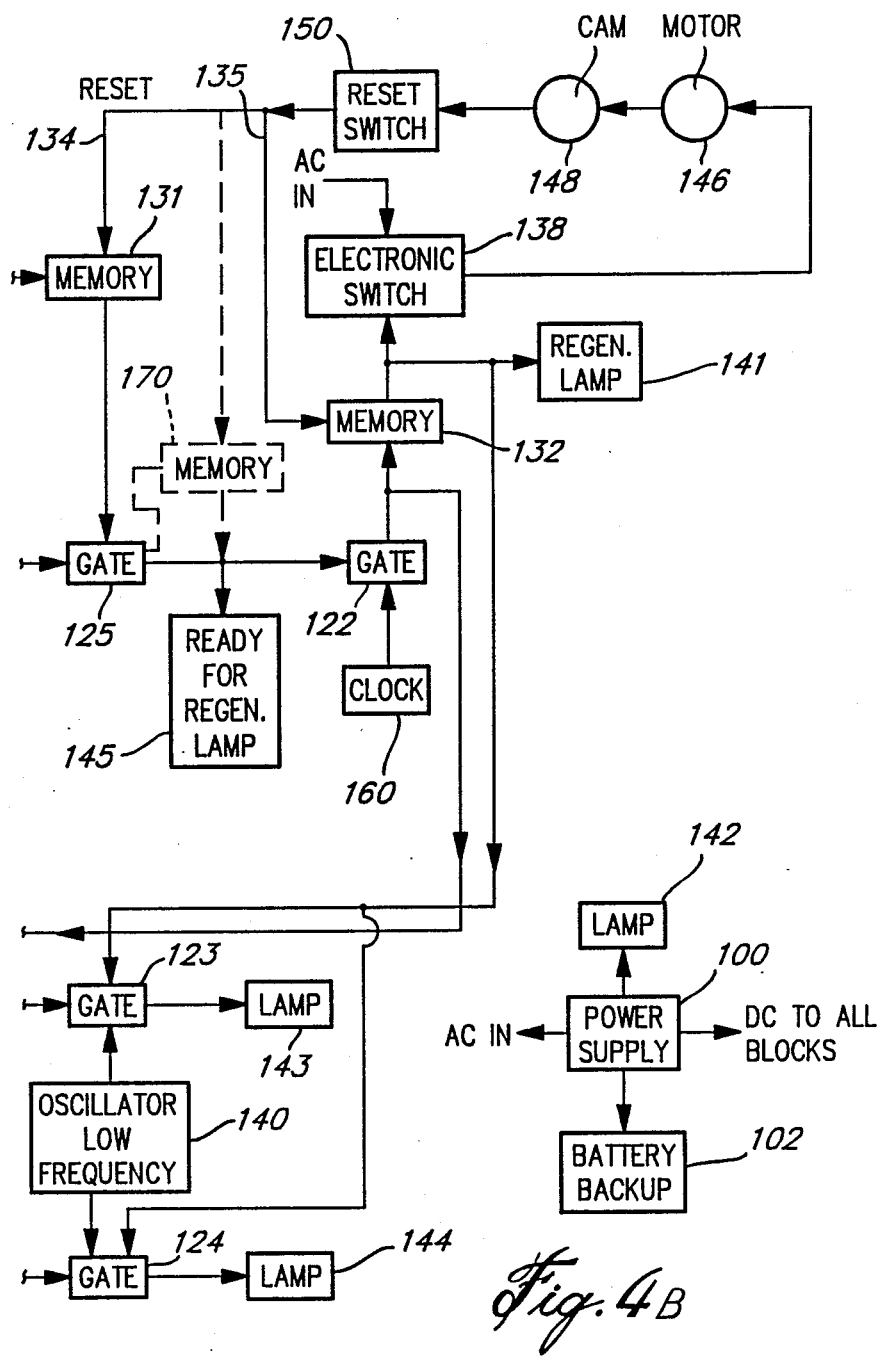

Referring to FIG. 4, there is shown a block diagram for the operation of the water conditioning controller of the present invention.

AC power is applied to the input of the power supply 100, which outputs DC voltage. This voltage is made available to the various circuit blocks. The power supply has a back up battery 102 to supply DC power in case of AC supply failure.

As described above, the system uses a total of four sensor sets. A set of probes consists of two electrodes physically spaced, but insulated from each other.

Probe set A (electrodes 40 and 42) is placed in the top part of the water conditioning resin and provides the means to measure the electrical resistance of the bed at that location. Probe set B (electrodes 46 and 48) is placed in the water conditioning resin at some distance below the probe set A. This set provides the means to measure the resistance of the bed at that location. Probe set D (electrodes 52 and 54) is placed near the probe set A; this set is enclosed so that it can only measure the resistance of the water, and not that of the resin. Also, this set provides the means to determine the temperature differential of the water. Probe set E (electrodes 60 and 62) is placed near probe set B. Like probe set D, this also measures the resistance of the water and not that of the resin and provides the means to determine the temperature differential of the water.

An AC current source 104 supplies current to the various probe sets. When AC current passes through the probes, it produce AC voltages, the magnitude of which depends on the resistance of the probes. Probe sets A and B are connected such that the current flowing through probe set A flows through probe set B, which are connected in series. Probe sets D and E are also connected in series such that the current flowing through probe set D flows through probe set E.

There are three AC reference voltages 106, 108 and 110 and one DC reference voltage 112 used in the system. Voltage VA is a fraction of the voltage available across the series connection of probe sets A and B. Voltage VB is a fraction of the voltage available across probes A and B. Voltage VB is not the same as voltage VA. Voltage VD is a fraction of the voltage available across the series connection of probes sets D and E. DC reference voltage VC is a fraction of the supply voltage.

The system employs a set of four comparators. The comparators are circuit blocks which compares the two voltages applied to their inputs, and depending on which voltage is greater produces a DC high or low level at their outputs.

Comparator A compares the AC reference voltage VA with that of the voltage VS available at the junction of the probe sets A and B. Comparator B compares the AC reference voltage VB with that of the voltage VS available at the junction of the probe sets A and B. Comparator C compares the voltage across the probe sets A and B and compares it after rectification to the DC reference voltage VC. Comparator D compares the AC reference voltage VD to the voltage VT available at the junction of probe sets D and E.

The circuit system has five gates 121, 122, 123, 124, 125.

Memories 131, 132 and 133 retain the information applied at their inputs even after the input has been removed. To erase information from these memories, reset inputs 134, 135 and 136 are provided. When proper signal levels appear at the reset inputs, the memories are cleared and their output returns to the original state.

An electronic circuit element 138 allows the AC current to flow depending on the level of the signal applied to its control input.

A low frequency oscillation 140 turns its output from on to off and back to on periodically. This provides signals to blink various lamps 141, 143 and 144. Lamps 141, 142, 143, 144 and 145 are solid state light emitting circuit elements and produce light when current flows through them.

Lamp 141 indicates system is regenerating

Lamp 142 indicates AC power is on

Lamp 143 indicates no brine was introduced during regeneration

Lamp 144 indicates low salt

Lamp 145 indicates that a regeneration will occur at the next alarm time.

A motor 146 drives the valve mechanism.

A notched disc or cam 148 is mounted on the control valve mechanism and is driven by the motor 146 along with the valve mechanism.

The reset switch 150 gives an output depending on the physical position of its actuating lever. Its output state reflects the mechanical position of the cam, which actuates the lever. The actuator sits in the notch of the disc when the valve is in the normal position of operation i.e. when hard water is being softened.

To understand the operation of the system shown in FIG. 4, the bed is first assumed to be fully regenerated. Under this condition, all the memories are in the off state. The resistance of probe sets A and B are substantially equal as well as that of probe sets D and E.

If soft water is drawn from the system, the resin bed will start deleting. The depletion starts at the top of the bed; consequently, the resistance of the probe set A will increase. The voltage VS available at the junction of probe sets A and B will change. The comparator A is continuously comparing the voltage VS with that of the reference voltage VA. The value of voltage VA is such that when the resistance ratio of probe set A to that of probe set B rises and exceeds a set limit (say 140%), then the comparator A gives an output. This is called the up sense phase.

Also, at the same time, comparator D is comparing the voltage at the junction of probe sets D and E with that of the reference voltage VD. The value of voltage VD is set such that the ratio of the resistance of probes D and E has to be within a set limit (say 105%); only then, the comparator D gives an output.

Gate 121 permits signals to appear at its output only if the outputs of comparator D and A are in the proper state at the same time. If this condition is met, the memory 131 is set.

If water is drawn further, the resistance of probe set A does not increase much, but that of the probe set B starts going high. Thus, the ratio of the resistances of the two probe sets will drop. Since the resistance ratio is going down, this is called the down sense phase.

Comparator B is continuously comparing voltages VS with that of the AC reference voltage VB. The voltage VB is chosen such that when the probe resistance ratio drops below a set lower limit (say 120%), the comparator B output goes high. This is the condition when the resin bed needs regeneration.

As water is drained further, the condition of comparator B cannot change, as the resistance ratio can only drop further.

A clock 160 gives an output signal at a particular fixed hour. At this time, if memory 131 is set and the output of comparator B is high, then the condition of gate 125 is met and its output sets the memory 132.

When memory 132 is set, the electronic switch 138 is turned on, which allows the motor 146 to turn. The motor is coupled to a mechanical valve which permits the resin to be regenerated. When the process of regeneration is started by the output of gate 122, the memory 133 is also set. Gate 123 output does not light the lamp 143 as long as the memory 132 is set, i.e. the regeneration is taking place.

During regeneration, at a certain stage, brine is introduced into the system. This causes the voltages across the probes A and B to drop. The sum of these dropped voltages are sensed by comparator C. If it is lower than the DC reference VC, the memory 133 is cleared indicating that brine was introduced. Otherwise, memory 133 remains set and hence after regeneration, lamp 143 goes on/off due to the gate 123 input changing state due to the oscillating action of the oscillator.

The end of regeneration is indicated by the operation of the reset switch by a cam operated by the motor. When the regeneration is over, memories 131 and 132 are cleared. Thus the electronic switch is turned off, the motor is stopped and the system is ready for the next regeneration.

During regeneration, the brine is drawn into the system and therefore the output of the low salt switch sensor 30 is available. Lamp 144 should be off in this condition; hence, gate 124 inhibits the operation of lamp 144. After regeneration, the water is re-introduced into the salt. If there is not enough salt, the lamp 144 will flash because of the oscillating input applied on to input of gate 124.

Although the invention has been described above in relation to one specific form, it will be evident to the person skilled in the art that it may be modified and refined in various ways. For example, an additional memory 170 may be provided when the condition for regeneration is met, i.e. memory 131 is set and the comparator B is high (i.e. the resistance ratio of probes A and B is lower than say 120%). This memory 170 remains in the set state until the reset is performed by the reset switch, which clears this memory. It is also possible instead of using secondary sets of electrically conductive probes, to use a specific temperature measuring means located adjacent to each primary probe set.

While the disclosure refers to the use of discreet electronic components, it is understood that microchip components can be substituted to achieve identical functions. It is therefore wished to have it understood that the present invention should not be limited in scope except by the terms of the following claims.

The embodiments of the invention in which an exclusive property or privilege is claimed are defined as follows:

1. In a tank containing water softening material, a tube for distributing in said tank water to be softened; top and bottom primary sets of electrically conductive probes spaced at a predetermined distance above one another within the water softening material, said probes facing into the water softening material and water to measure the electrical resistance of the material at their respective locations; top and bottom secondary sets of electrically conductive probes spaced at a predetermined distance above one another within the softening material, the probes of said secondary sets being exposed to water only to measure the electrical resistance of the water at their respective locations; the probes of the top primary set being disposed adjacent the probes of the top secondary set; the probes of the bottom primary set being disposed adjacent the probes of the bottom secondary set.

2. In a tank as defined in claim 1, said tube being mounted centrally of said tank said top and bottom primary sets of probes and said top and bottom secondary sets of probes being mounted to said tube.

3. In a tank as defined in claim 1, said secondary sets of probes being encased in perforated housings so as to be exposed to water only.

4. A system for determining the state of water softening material and water in a water softening tank for causing regeneration of the softening material if depleted, comprising: top and bottom primary sets of electrically conductive probes spaced at predetermined distance above one another within the water softening material, said probes facing into the water softening material and water; top and bottom secondary sets of electrically conductive probes spaced at a predetermined distance above one another within the softening material, the probes of said secondary sets being exposed to water only; the probes of the top primary set being disposed adjacent the probes of the top secondary set; the probes of the bottom primary set being disposed adjacent the probes of the bottom secondary set; means measuring the resistance of said sets of probes and providing voltage signals; means comparing the resistance of the probes of the top primary set to the resistance of the probes of the bottom primary set and defining the probes of said top primary set as a standard when the resistances of the probes of the secondary sets are substantially equal to one another; and means comparing the probes of the bottom primary set to said standard.

5. A system for sensing the need for regeneration of water softening material in a water softening tank having water softening material therein, comprising: top and bottom primary sets of electrically conductive probes spaced at predetermined distance above one another within the water softening material, said probes facing into the water softening material and water; top and bottom secondary sets of electrically conductive probes spaced at a predetermined distance above one another within the softening material, the probes of said secondary sets being exposed to water only; the probes of the top primary set being disposed adjacent the probes of the top secondary set; the probes of the bottom primary set being disposed adjacent the probes of the bottom secondary set; means monitoring the resistance of said sets of probes; first means comparing the resistance of the probes of the top primary set to the resistance of the probes of the bottom primary set when the resistance of the secondary probes are substantially equal to one another so as to define the probes of said top primary set as a standard; second means comparing the probes of the bottom primary set to said standard; means responsive to said second comparing means to warrant regeneration of the water softening material in said tank when a predetermined comparative value is reached indicating that the water softening material is depleted.

6. A system as defined in claim 5, further comprising timing control means allowing to check said second comparing means at predetermined time periods.

7. A system as defined in claim 5 further comprising said second means compare the probes of the bottom primary set to said standard when the resistances of the secondary probes are substantially equal to one another, and further comprising means creating an electronic latch upon indication of regeneration.

8. A system as defined in claim 7 further comprising timing control means allowing to check the condition of said electronic latch at predetermined time periods.

9. A system as defined in claim 5, further comprising drive motor means to control the flow of water during regeneration.

10. A system as defined in claim 5, comprising switch means for resetting, after regeneration, the circuit to allow said first comparing means to be energized.

11. A system for determining the state of water softening material and water in a water softening tank for causing regeneration of the softening material if depleted, comprising: top and bottom primary sets of electrically conductive probes spaced at predetermined distance above one another within the water softening material, said probes facing into the water softening material and water; top and bottom temperature sensing means spaced at a predetermined distance above one another within the softening material and being exposed to water only; the probes of the top primary set being disposed adjacent the top temperature sensing means; the probes of the bottom primary set being disposed adjacent the bottom temperature sensing means; means measuring the resistance of said sets of probes and said temperature sensing means and providing voltage signals; means comparing the resistance of the probes of the top primary set to the resistance of the probes of the bottom primary set and defining the probes of said top primary set as a standard when the resistances of the temperature sensing means are substantially equal to one another; and means comparing the probes of the bottom primary set to said standard.

* * * * *